J. H. GENTRY.
VALVE GEAR.
APPLICATION FILED NOV. 10, 1910.
1,015,308.
Patented Jan. 23, 1912.
2 SHEETS—SHEET 1.
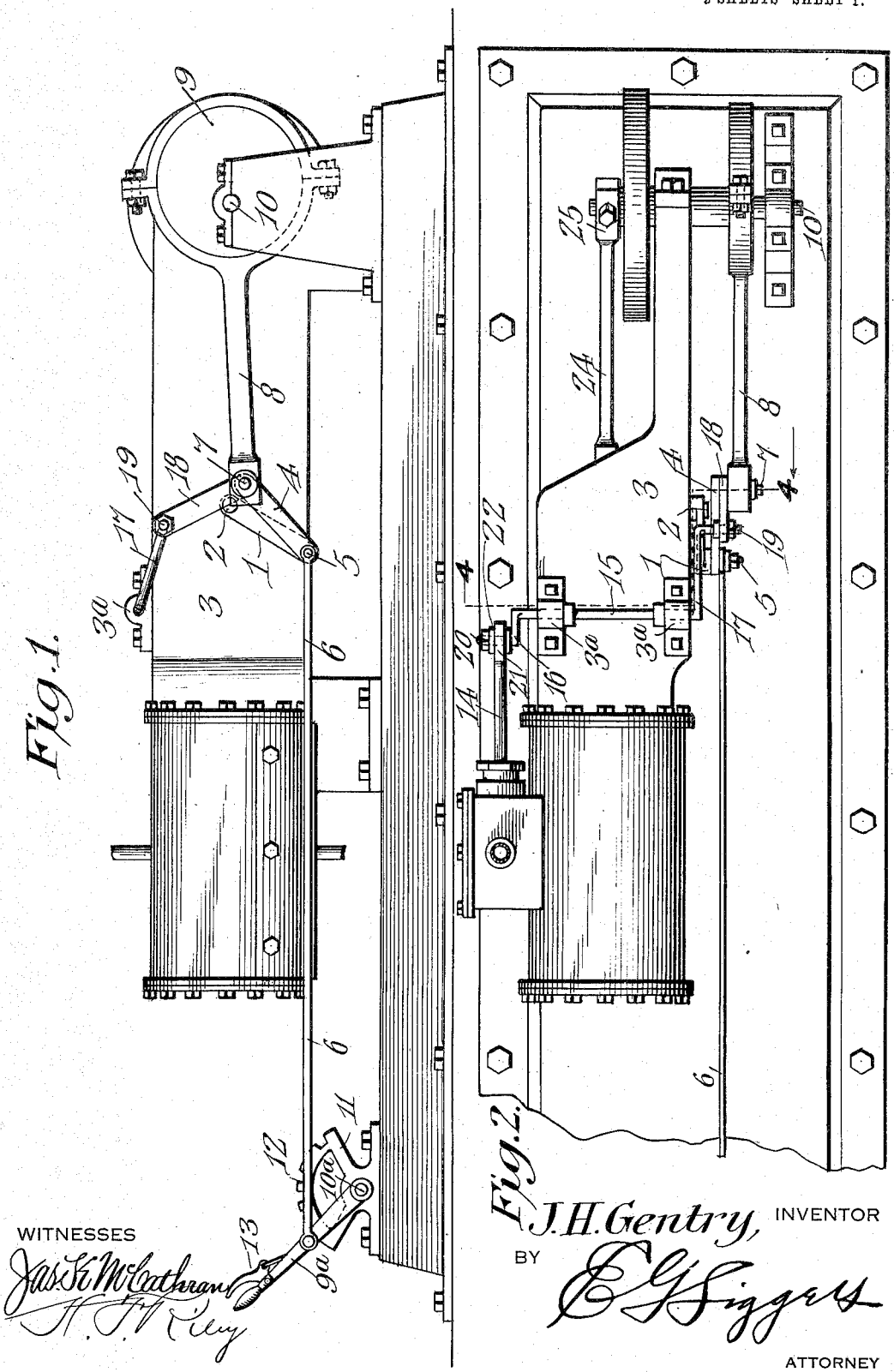
WITNESSES
J. H. Gentry, INVENTOR
BY 
ATTORNEY J. H. GENTRY.
VALVE GEAR.
APPLICATION FILED NOV. 10, 1910.
1,015,308.
Patented Jan. 23, 1912.
2 SHEETS—SHEET 2.
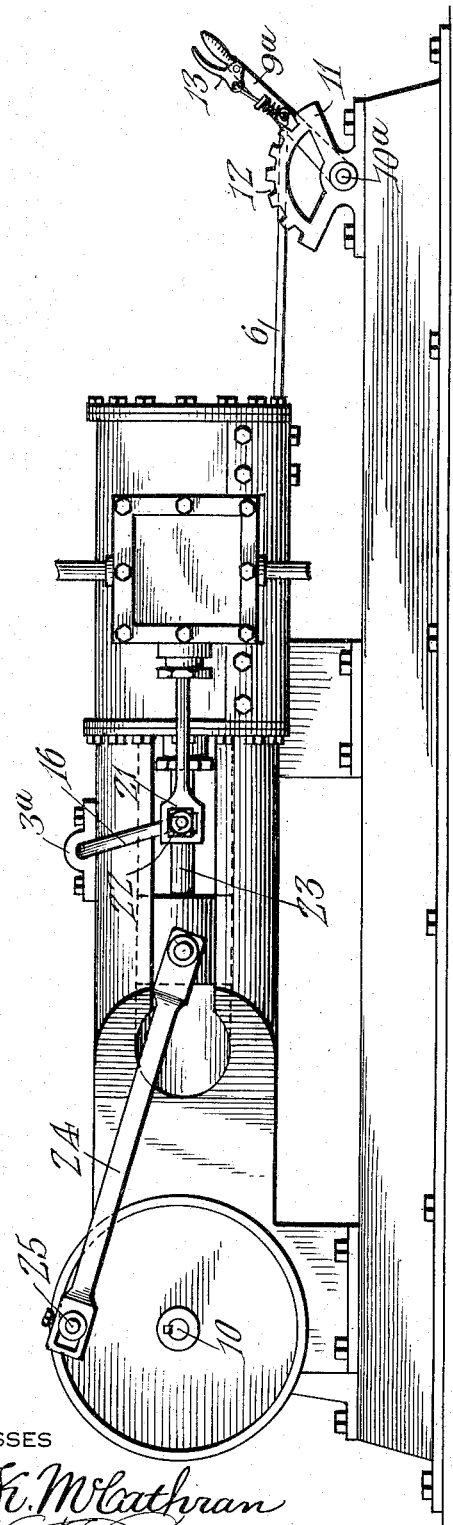
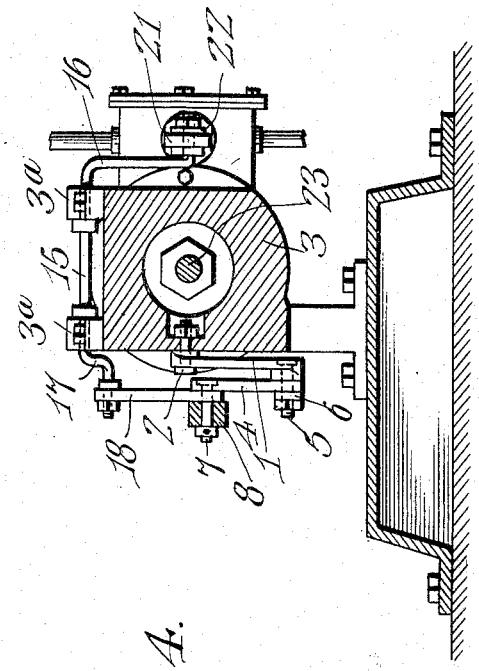
WITNESSES
J. H. Gentry, INVENTOR
BY
ATTORNEY

UNITED STATES PATENT OFFICE.

JOHN H. GENTRY, OF GREENTOWN, INDIANA.

VALVE-GEAR.

1,015,308.  Specification of Letters Patent.  Patented Jan. 23, 1912.

Application filed November 10, 1910. Serial No. 591,739.

*To all whom it may concern:*

Be it known that I, JOHN H. GENTRY, a citizen of the United States, residing at Greentown, in the county of Howard and State of Indiana, have invented a new and useful Valve-Gear, of which the following is a specification.

The invention relates to improvements in valve gears for engines.

The object of the present invention is to improve the construction of valve gear for stationary and other engines, and to provide a simple, efficient and comparatively inexpensive valve gear, adapted to secure a quick and full opening of the steam port early in the valve travel, and capable of permitting the same to remain open a maximum length of time and of effecting a rapid cut-off of the steam at the end of the valve travel.

Another object of the invention is to provide a valve gear of this character, capable of being easily reversed and adapted to be hooked up at any point without interfering with the proper operation of the valve.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a valve gear, constructed in accordance with this invention, and shown applied to a stationary engine. Fig. 2 is a plan view of the same. Fig. 3 is an elevation of the opposite side of the engine from that shown in Fig. 1. Fig. 4 is a transverse sectional view on the line 4—4 of Fig. 2.

Like numerals of reference designate corresponding parts in all the figures of the drawings.

In the embodiment of the invention illustrated in the accompanying drawings, the valve gear comprises in its construction an inverted reverse link 1, pivoted at its upper end 2 to the frame 3 of an engine or other suitable support, and pivotally connected at its lower end with an inverted radius link 4 by a pin 5, or other suitable pivot, which also connects the inner end of a reach rod 6 to the reverse link. The upper end of the radius link is pivoted by a pin 7 to an eccentric rod 8 of an eccentric 9, which is mounted on the crank shaft 10. The reciprocatory member or eccentric rod 8 imparts motion through its reciprocation to the radius link, which, through the oscillation of the reverse link 1, is adapted to be swung to either side to a perpendicular position to reverse the steam engine. The reverse link is also adapted to be secured at an intermediate position to cut off the steam and also to be hooked up at any point between a central position and the limit of its adjustment in either direction. This adjustment is effected through an upright reverse lever $9^a$, pivoted at its lower end $10^a$ to a stand 11, having a notched or toothed segment 12, which is engaged by a spring actuated dog or detent 13 carried by the reverse lever, and operated by a latch lever. The reversing of the mechanism and the adjustment thereof are accomplished with greater ease than heretofore, owing to the particular arrangement of the radius and reverse links with relation to the eccentric rod, and the means hereinafter described for communicating motion from the radius link to the valve rod 14 has the same adjustment and is not materially resisted by the valve motion.

Motion is communicated from the radius link to the valve rod by means of a bell crank, located above the plane of the reverse and radius links and consisting of a transverse rock shaft or pivot 15, a depending rocker arm 16 and an approximately horizontal rocker arm 17, arranged to swing upwardly and downwardly from a horizontal position and connected with the radius link and the eccentric rod by a link 18. The rocker arms are located at opposite sides of the frame of the engine, and the transverse pivot or rock shaft extends across the top of the frame of the engine and is journaled in suitable bearings $3^a$, as clearly illustrated in Fig. 2 of the drawings. The lower end of the link 18 is connected with the radius link and the eccentric rod by the pivot 7, and its upper end is connected with the rocker arm 17 by a suitable pivot 19, which may, as illustrated in the accompanying drawings, be formed integral with the rocker arm. The depending rocker arm 16 is provided at its lower end with the pivot 20, which is connected with the valve rod 14. The valve rod is equipped with a head 21, having a suitable opening receiving the slidable bearing 22 to permit the necessary play of the parts incident to the oscillation of the rocker arm, but any other suitable means may be employed for effecting this result, such as a link connection between the rocker arm 16 and the valve rod. The piston rod 23 is connected by a main rod 24 with a suitable crank element 25 of the shaft 10.

The valve may be either inside or outside admission, and the valve gear may be applied to various types of engines, and it produces a quick opening and closing of the valve and permits the valve to remain wide open a maximum length of time.

Having thus fully described my invention, what I claim as new and desire to secure by Letters Patent, is:—

1. In a valve gear, the combination with a valve rod, and a horizontal reciprocatory eccentric rod disposed longitudinally of the engine, of an inverted reverse link pivoted at its upper end and extending below the plane of the eccentric rod, an inverted radius link pivotally connected at its lower end to the lower end of the reverse link and at its upper end with the said eccentric rod and located below the plane of the same, an upright link extending upwardly from the eccentric rod and pivotally connected at its lower end with the radius link, and a bell crank actuated by the upright link and connected with the valve rod.

2. In a valve gear, the combination with a horizontal reciprocatory eccentric rod disposed longitudinally of the engine, of an inverted reverse link located at one side of the frame of the engine and pivoted at its upper end and extending below the eccentric rod, an inverted radius link located below the plane of the eccentric rod and connected at its upper end to the same and pivoted at its lower end to the reverse link, an upright link extending upwardly from the eccentric rod and pivotally connected at its lower end to the upper end of the radius link, a bell crank consisting of an approximately horizontal rocker arm located at one side of the engine and arranged to swing upwardly and downwardly and extending to a point above the reverse link and connected to the upper end of the upright link, a depending rocker arm located at the opposite side of the engine and connected with the valve rod, and a pivot extending across the frame of the engine and connecting the said rocker arms.

3. In a valve gear, the combination with a horizontal reciprocatory eccentric rod disposed longitudinally of the engine, of an inverted reverse link located at one side of the frame of the engine and pivoted at its upper end and extending below the eccentric rod, an inverted radius link located below the plane of the eccentric rod and connected at its upper end to the same and pivoted at its lower end to the reverse link, an upright link extending upwardly from the eccentric rod and pivotally connected at its lower end to the upper end of the radius link, a bell crank consisting of an approximately horizontal rocker arm located at one side of the engine and arranged to swing upwardly and downwardly and extending to a point above the reverse link and connected to the upper end of the upright link, a depending rocker arm located at the opposite side of the engine and connected with the valve rod, a pivot extending across the frame of the engine and connecting the said rocker arms, a reverse lever, and a horizontal reach rod connected with the reverse lever and with the reverse link and located below the plane of the eccentric rod.

In testimony that I claim the foregoing as my own, I have hereto affixed my signature in the presence of two witnesses.

JOHN H. GENTRY.

Witnesses:
H. E. ASH,
F. R. HILL.